(No Model.)

W. FIELDING.
BUTTER MOLD.

No. 560,202.

Patented May 19, 1896.

Witnesses:
L. C. Hills
Geo. M. Copenhaver

Inventor:
William Fielding,
by Franklin H. Hough
Atty.

UNITED STATES PATENT OFFICE.

WILLIAM FIELDING, OF LEWISTON, MAINE.

BUTTER-MOLD.

SPECIFICATION forming part of Letters Patent No. 560,202, dated May 19, 1896.

Application filed December 6, 1895. Serial No. 571,281. (No model.)

*To all whom it may concern:*

Be it known that I, WILLIAM FIELDING, a citizen of the United States, residing at Lewiston, in the county of Androscoggin and State of Maine, have invented certain new and useful Improvements in Butter-Molds; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in butter-molds, and it has for its object the general improvement of this class of appliances and the provision of a separable molding device, which, if desired, may embrace a series of molds of any preferred form or design, the device being composed of three independent parts or sections so connected as to permit of their being separated for a sufficient distance to remove the butter cakes from the molds by simply turning the device upside down and applying a slight downward pressure, and when the butter has been thus expelled from the molds the sections of the mold are automatically reunited by the action of springs.

To these ends and to such others as the invention may pertain, the same consists in the novel construction and in the peculiar combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which drawings—

Figure 1:
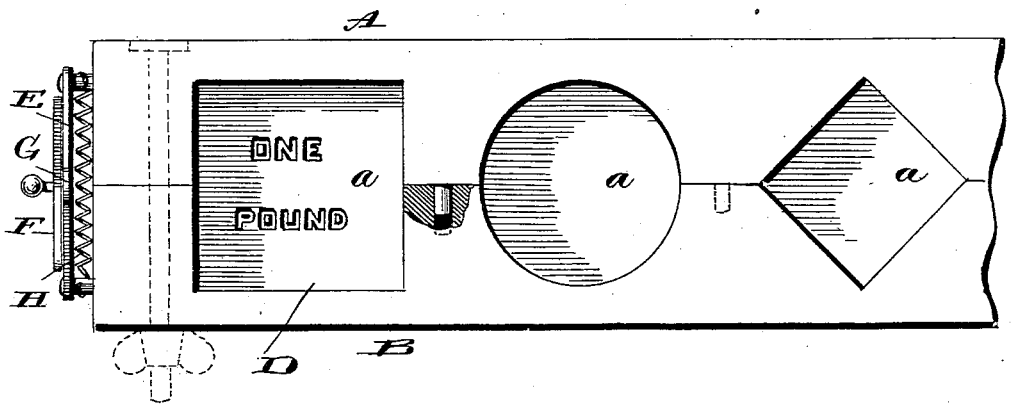
Figure 2:
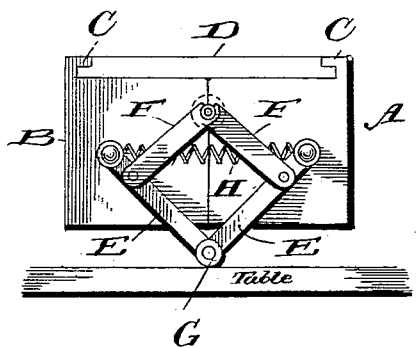

Figure 1 is a bottom plan view of a butter-molding device embodying my invention. Fig. 2 is an end view of the device as it appears when closed, and Fig. 3 a like view showing the sections separated.

Reference now being had to the details of the drawings by letter, A and B represent the two side portions or halves of the mold, which are provided with any desired number of molds *a a*, said molds being either round, square, hexagonal, or of any particular size or form that taste may dictate or necessity require. The outer side edges of the mold-sections A and B are provided at their upper ends with inwardly-extending flanges or projections C C, which projections overlap the longitudinal edges of the cover D, which part D is upon its under face provided with the figures or designs which are to be imparted to the top of the butter cakes when formed in the several molds *a*, as will be readily understood. The sections A and B are at their ends provided with pivoted levers E E and F F, the levers E E each having one of its ends pivoted to the end of one of the mold-sections, while the opposite lever is pivoted at one of its ends in like manner to the opposite mold-section, the free ends of the said levers being pivotally united together, thus forming a toggle-joint, the length of the levers E being such that when the two mold-sections are in close contact, as when the molds are closed, the knuckle G will extend a considerable distance beyond the top surface of the mold-sections. The levers F F are at their outer ends pivoted to the levers E E at substantially the longitudinal centers of the said levers E, and the opposite ends of the levers are pivotally connected together, as shown. A coiled spring H, having its ends attached to the respective blocks or mold-sections A and B, serves to normally draw the two sections together. It is of course my purpose to provide both ends of the mold-sections with levers and springs, as described.

Figure 3:
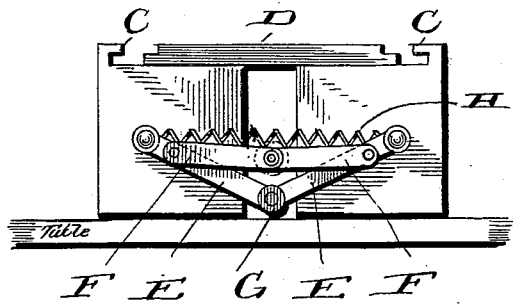

The operation of the device is simple and will be readily understood from the foregoing description. When it is desired to fill the molds, the knuckle G is forced downward slightly, when the spring H serves to draw the two side sections of the molds together, which in uniting draw into place the cover D. The butter is then placed in the molds. In releasing the butter cakes from the mold it is simply necessary to turn the mold upside down, when by forcing the device downward upon the table the knuckles G are forced upward and the side sections are forced apart, as shown in Fig. 3 of the drawings, and the butter cakes are thus released from the molds. A bolt provided with a thumb-screw may be passed through the sections of the mold after they have been brought together by the toggles, as shown by dotted lines in the drawings, to securely lock the sections together against any possible separation.

Having thus described my invention, what I claim to be new, and desire to secure by Letters Patent, is—

1. In a butter-molding device of the character described, the mold-sections A and B, provided with a series of molds as shown, the toggle-lever connections, the springs also connecting the sections and serving to normally hold the same in contact, and the top section D held in place by the overlapping extensions or arms C of the side sections, substantially as described.

2. The combination with the two side sections of a molding device, of the character described, of the cover, held in place by the side sections having overlapping portions engaging with the cover, springs at the ends of the side sections serving to normally hold the sections together, and means, substantially as described for forcing the side sections apart against the tension of the springs, substantially as described.

In testimony whereof I affix my signature in presence of two witnesses.

WILLIAM FIELDING.

Witnesses:
SAMUEL HIBBERT,
MICHAEL KING.